US011337361B2

(12) United States Patent
Lanyon (10) Patent No.: US 11,337,361 B2
(45) Date of Patent: May 24, 2022

(54) SEED ENTRAINMENT UNIT

(71) Applicant: SPOT ON AG PTY LTD, Boort (AU)

(72) Inventor: Steve Lanyon, Boort (AU)

(73) Assignee: SPOT ON AG PTY LTD, Boort (AU)

( * ) Notice: Subject to any disclaimer, the term of this patent is extended or adjusted under 35 U.S.C. 154(b) by 0 days.

(21) Appl. No.: 16/760,073

(22) PCT Filed: Oct. 31, 2018

(86) PCT No.: PCT/AU2018/051177
§ 371 (c)(1),
(2) Date: Apr. 29, 2020

(87) PCT Pub. No.: WO2019/084611
PCT Pub. Date: May 9, 2019

(65) Prior Publication Data
US 2020/0359554 A1    Nov. 19, 2020

(30) Foreign Application Priority Data

Oct. 31, 2017   (AU) ................. 2017904413

(51) Int. Cl.
*A01C 7/08*   (2006.01)

(52) U.S. Cl.
CPC .............. *A01C 7/082* (2013.01); *A01C 7/084* (2013.01)

(58) Field of Classification Search
CPC ........ B65G 53/12; B65G 53/14; B65G 53/50; B65G 2812/1633; A01C 7/10; A01C 7/20; A01C 7/08; A01C 7/081; A01C 7/082; A01C 7/084; A01C 7/042; B01F 5/0413

USPC ................. 406/95, 124, 125, 126, 144, 146; 111/174; 222/399
See application file for complete search history.

(56) References Cited

U.S. PATENT DOCUMENTS

| | | | | | |
|---|---|---|---|---|---|
| 2,524,919 | A | * | 10/1950 | Meincke | B65G 53/12 406/34 |
| 2,530,689 | A | * | 11/1950 | Egger | B05B 7/1463 406/144 |
| 2,734,782 | A | * | 2/1956 | Doe | B65G 53/22 406/132 |
| 2,919,159 | A | * | 12/1959 | Lacroix | B65G 53/00 406/137 |
| 3,693,840 | A | * | 9/1972 | Starr | B65G 53/12 406/129 |

(Continued)

OTHER PUBLICATIONS

International Search Report for Application No. PCT/AU2018/051177 dated Dec. 21, 2018 (3 pages).

(Continued)

*Primary Examiner* — Joseph A Dillon, Jr.
(74) *Attorney, Agent, or Firm* — Michael Best & Friedrich LLP (57) ABSTRACT

The invention is directed broadly to an entrainment unit for distributing seed, comprising: a seed chamber for seed in bulk; a mixing chamber for mixing seed and air, the mixing chamber having an outlet for discharging entrained seeds; and an air supply unit for: (a) supplying a first air flow to the seed chamber and entraining and transporting seed to the mixing chamber, and (b) supplying a second air flow to the mixing chamber for forming a combined air flow that entrains the seed and transports the seed through the discharge outlet.

23 Claims, 9 Drawing Sheets (56) References Cited

U.S. PATENT DOCUMENTS

| | | | | |
|---|---|---|---|---|
| 5,494,381 | A * | 2/1996 | Heyl | B65G 53/12 |
| | | | | 406/14 |
| 5,915,312 | A * | 6/1999 | Meyer | A01C 19/04 |
| | | | | 111/174 |
| 6,821,060 | B2 * | 11/2004 | McTurk | B01F 3/1271 |
| | | | | 241/160 |
| 8,448,585 | B2 | 5/2013 | Wilhelmi et al. | |
| 8,936,416 | B2 * | 1/2015 | Stutz, Jr. | B24C 9/00 |
| | | | | 406/132 |
| 8,985,400 | B2 * | 3/2015 | Swan | B24C 7/0069 |
| | | | | 222/200 |
| 2010/0326339 | A1 * | 12/2010 | Georgison | A01C 7/081 |
| | | | | 111/175 |
| 2014/0193211 | A1 | 7/2014 | Connors et al. | |
| 2014/0193212 | A1 | 7/2014 | Johnson et al. | |
| 2014/0193213 | A1 | 7/2014 | Johnson et al. | |

OTHER PUBLICATIONS

Australian International-Type Search for Provisional Patent Application No. AU2017904413 dated Mar. 28, 2018 (9 pages).

\* cited by examiner

SEED ENTRAINMENT UNIT

TECHNICAL FIELD

The invention relates to the field of agricultural equipment. Specifically, the invention relates to an entrainment unit for distributing seed and grain from a bulk storage source and a method of distributing seed using the entrainment unit.

BACKGROUND

The control and precision with which seed is distributed via a seeder is an important issue.

Typically, a seeder operates as follows to deliver seed to a field: the bulk seed is delivered to a hopper; the hopper divides the seed into individual portions; the individual portions are entrained in air and sent through a metering device; and the metering device transfers individual seeds to a planting wheel to be dispersed to the soil. Interference with any one of the above steps can jeopardise the individual seed distribution to the planting wheel and further disrupt a steady, uninterrupted flow of seed to a field.

Different seed has different sizes, for example, crops like canola and wheat may have seed of 2-3 mm, while corn and fava beans can be close to 7-8 mm in size. As such, the equipment used for dispersing the seed must cater for a range of seed sizes and weights, for efficient use. This can cause problems where a farmer needs to shift quickly between planting one crop type to another. If the distribution system is configured for small seeds there may not be sufficient air flow to entrain large seeds. Conversely, if the system is configured for larger seeds the air flow can be too high for small seed and block the flow by entraining too many small seeds in the air flow.

The present invention was conceived with these shortcomings in mind.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

SUMMARY OF THE INVENTION

In broad terms, the invention provides an entrainment unit for distributing seed, comprising: a seed chamber for seed in bulk; a mixing chamber for mixing seed and air, the mixing chamber having an outlet for discharging entrained seeds; and an air supply unit for: (a) supplying a first air flow to the seed chamber and entraining and transporting seed to the mixing chamber, and (b) supplying a second air flow to the mixing chamber for forming a combined air flow that entrains the seed and transports the seed through the discharge outlet.

In one aspect of the invention, there is provided an entrainment unit for distributing seed, comprising: a seed chamber for seed in bulk; a mixing chamber for mixing seed and air, the mixing chamber having an outlet for discharging entrained seeds; and an air supply unit having a single air outlet divided into a first passageway and a second passageway for: (a) supplying a first air flow via the first passageway to to the seed chamber so that the first air flow travels across the seed chamber and entraining and transporting seed to the mixing chamber, and (b) supplying a second air flow via the second passageway extending around the seed chamber and directly into the mixing chamber for forming a combined air flow that entrains the seed and transports the seed through the discharge outlet.

The entrainment unit may be adapted to provide a laminar air flow upstream of the mixing chamber.

The entrainment unit may be adapted to provide a turbulent air flow within the mixing chamber.

The air supply unit may comprise an air chamber for receiving air from an air source, such as a motor driven fan or a compressed air source, and for supplying air as the first air flow to the seed chamber and air as the second air flow directly to the mixing chamber without passing though the seed chamber.

The air chamber may comprise an inlet for air flow into the air chamber and two outlets for the first air flow and the second airflow to exit the air chamber.

The air chamber may comprise an inlet for air flow into the air chamber and the air outlet may provide two discrete outlets to exit air from the air chamber, a first outlet for the first air flow to exit the first passageway and a second outlet for the second airflow to exit the second passageway into the mixing chamber.

A first outlet of the air chamber may comprise a first passageway in fluid communication with the seed chamber and a second outlet of the air chamber comprises a second passageway in fluid communication with the mixing chamber. The first and second passageways may be parallel to each other.

The entrainment unit may include a common wall that separates the first and second passageways. The common wall may extend from the air chamber to the mixing chamber. The common wall may comprise three portions, namely an inclined portion situated at least partially in the air chamber; a seed chamber portion that extends between the air chamber and the mixing chamber; and an upwardly curved portion that extends into the mixing chamber.

The inclined portion of the common wall may provide a leading edge to separate airflow exiting the air chamber into the first and the second air flows.

The upwardly curved portion of the common wall may be configured to cause the first and second passageways to supply the first and second air flows upwardly into the mixing chamber as parallel streams of air that promote turbulence in the mixing chamber.

The seed chamber portion of the common wall may define a lower wall of the seed chamber.

An internal baffle may separate the mixing chamber and the seed chamber. The baffle may include a curved surface for reducing turbulence in the combined air flow near the discharge outlet. The air chamber may be a high-pressure chamber.

The seed chamber may have a volume similar to a volume of the air chamber. The seed chamber may be a low-pressure chamber. The seed chamber may have a larger volume than a volume of the mixing chamber. The seed chamber may have a substantially V-shaped cross-section. The seed chamber may provide an open mouth for receiving seed in bulk.

The seed chamber may include a pair of inclined side walls for funneling seed under gravity feed towards the mixing chamber. Seed may move through the seed chamber under the force of gravity.

The entrainment unit may be configured such that each of the first and second air flows are of a similar volume. Alternatively, each of the first and second air flows may be of a dissimilar volume.

The discharge outlet may provide a conduit extending from the mixing chamber. The conduit may extend at an angle of less than 90 degrees from the flow direction of the combined air flow and entrained seed.

The entrainment unit may further comprise a sealable opening to facilitate access to an interior of the unit. The sealable opening may be located on a lower portion of the entrainment unit, when the unit is installed for use, such that seed evacuates the entrainment unit via the opening under the force of gravity. The sealable opening may be sealed by a closer configured to be pivotally connected to the entrainment unit. A portion of the common wall may be mounted to the closer to be removably located within the entrainment unit.

The entrainment unit may further comprise at least one mounting flange for engaging with a seed hopper.

The entrainment unit may comprise two parallel side walls for cooperative engagement with a subsequent entrainment unit.

The entrainment unit may comprise: a pair of end plates, an access panel and an internal wall form.

The internal wall form may comprise the discharge outlet. Each of the internal walls and the common wall may be configured as a single integrated moulding. The wall form may comprise at least one of a plastic, fibreglass, moulded composite, and fibre reinforced plastic.

In another embodiment, there is provided a method of distributing seed, comprising the steps of: supplying seed in bulk to a seed chamber; entraining seed in a first air flow in the seed chamber; transporting the seed from the seed chamber into a mixing chamber; supplying a second air flow directly to the mixing chamber so that the first and second air flows mix seed entrained in the first air flow in the mixing chamber and transporting the seed through a discharge outlet of the mixing chamber.

The method may further comprise a step of supplying the first air flow and the second air flow as parallel air flows into the mixing chamber so that the second air flow facilitates drawing the first air flow with entrained seed into the mixing chamber and minimises the possibility of blockages of the entrained seed from the seed chamber.

The method may further comprise a step of supplying the first air flow to the seed chamber as a laminar flow.

The method may further comprise a step of supplying the second air flow to the mixing as a laminar flow.

The method may further comprise a step of supplying the first air flow and entrained seed to the mixing chamber and creating a turbulent flow in the mixing chamber.

The method may further comprise a step of creating the turbulent air flow upon entry to the mixing chamber.

The method may further comprise a step of attaching a hose to the discharge outlet to direct the entrained seed and air mixture to a seed metering unit. The method may further comprise a step of attaching a hopper to an inlet of the entrainment unit to supply seed thereto. The method may further comprise a step of sensing the capacity of seed within the entrainment unit to control the flow of seed thereto from the hopper.

In a further embodiment, there is provided a method of constructing a multi-outlet entrainment unit, the entrainment unit comprising a plurality of wall forms, each wall form having a seed chamber, a mixing chamber and a discharge outlet, the method comprising the steps of: orienting a plurality of wall forms, in side-by-side relationship, to form a collective seed chamber therebetween; sealing the sides of the collective seed chamber; connecting an air supply unit to the collective seed chamber to provide: (i) a first air flow to drive seed from the collective seed chamber via the first air flow toward each of the plurality of mixing chambers, and (ii) a second air flow communicated directly into each of the plurality of mixing chambers, such that the first and second air flows mix seed entrained in the first air flow in each of the mixing chambers to transport the seed through a discharge outlet of each mixing chamber.

Each wall form may further comprise a common wall configured to separate the first air flow from the second air flow.

The method may further comprise a step of converting the first laminar air flow and entrained seed therein into a turbulent air flow upon entering each of the mixing chambers.

The method may further comprise the step of attaching a hopper to an inlet of the collective seed chamber to supply seed thereto in bulk.

Various features, aspects, and advantages of the invention will become more apparent from the following description of embodiments of the invention, along with the accompanying drawings in which like numerals represent like components.

BRIEF DESCRIPTION OF THE DRAWINGS

Embodiments of the invention are illustrated by way of example, and not by way of limitation, with reference to the accompanying drawings, of which.

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION OF EMBODIMENTS

Whist the entrainment unit is described herein in relation to entraining seeds or grain within an air flow, it is contemplated that the entrainment unit is applicable to for entraining and dispersing a variety of items delivered in bulk that may need to be separated and distributed in a controlled manner, for example pellets, food stuffs and the like.

Figure 1:
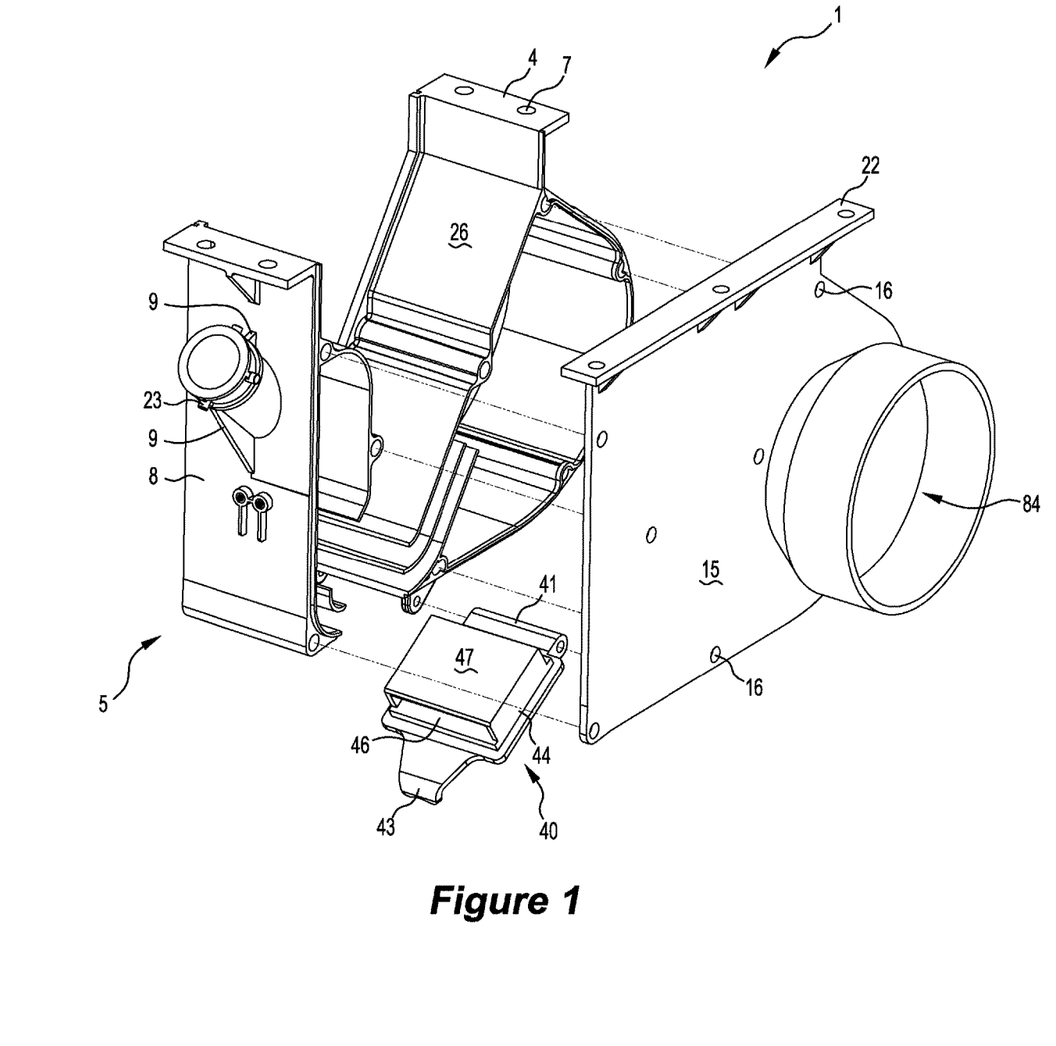
FIG. 1 is an exploded perspective view of a wall form, a sealable door and a closing plate, that together form an entrainment unit according to an embodiment of the invention.

With reference to FIG. 1, there is illustrated an entrainment unit 1 for distributing seed, comprising:
- a seed chamber 10 for seed in bulk;
- a mixing chamber 20 for mixing seed and air, the mixing chamber 20 having a discharge outlet 25 for discharging entrained seeds; and
- an air supply unit 31 for: (a) supplying a first air flow 32 to the seed chamber 10 and entraining and transporting seed to the mixing chamber 20, and (b) supplying a second air flow 34 to the mixing chamber 20 for forming a combined air flow 36 that entrains the seed and transports the seed through the discharge outlet 25.

The entrainment unit 1 comprises an internal wall form 5 and a pair of end plates 15 (only one illustrated in FIG. 1) which partially seal the wall form 5. The wall form 5 and the end plates 15 define the seed chamber 10, mixing chamber 20, and air supply unit 31.

The entrainment unit 1 further comprises a door 40 for accessing at least one of the seed chamber 10 and the mixing chamber 20.

A plurality of mounting holes 16 are formed in the end plates 15 which correspond with a plurality of mounting apertures 6 in the wall form. The mounting apertures 6 of the wall form 5 can be threaded to secure the end plate 15 thereto. Alternatively, the mounting apertures 16 can extend entirely through the wall form 5 and through each of the pair of end plates 15 to be secured externally of the entrainment unit 1. The end plates 15 can be connected, for example, by using a nut, bolt, circlip, spring clip or the like that can be easily engaged or removed, when access to the interior chambers 10, 20, 30 is required. The end plate 15 is tightened against an abutting edge 56 of the wall form 5. The abutting edge 56 can be flat, or tapered, to assist in reducing air loss from within the entrainment unit. In some embodiments, the abutting edge 56 can be profiled to seat a seal (not illustrated).

Figure 11A:
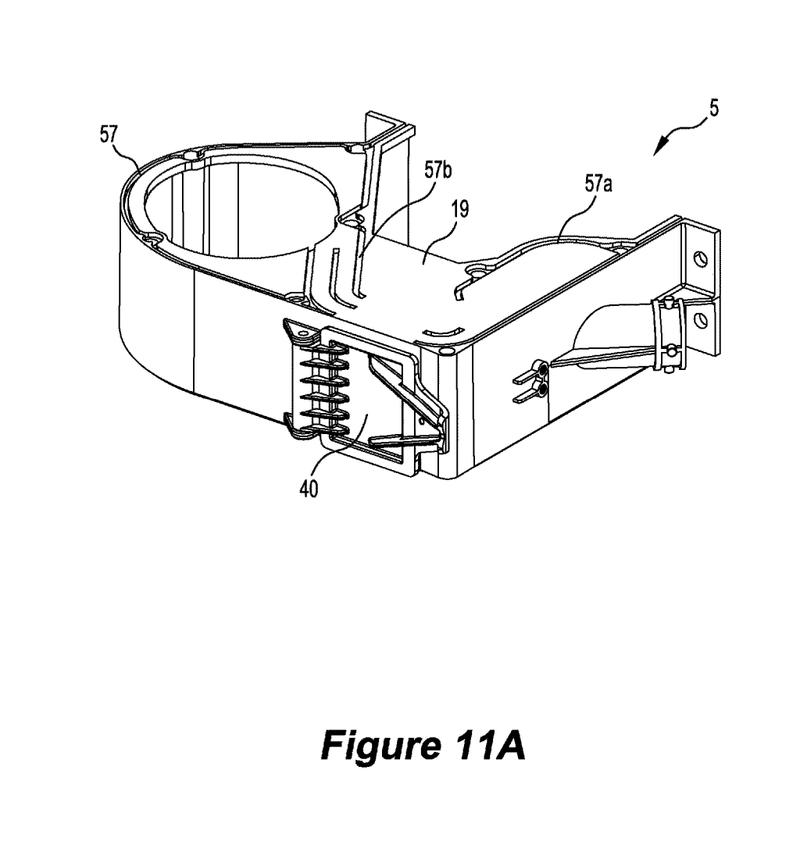
FIG. 11A is a perspective view of a closed formwork side of the entrainment unit, illustrating a plurality of recesses for receiving walls of an adjacent wall form when stacked together side-by-side.
Figure 11B:
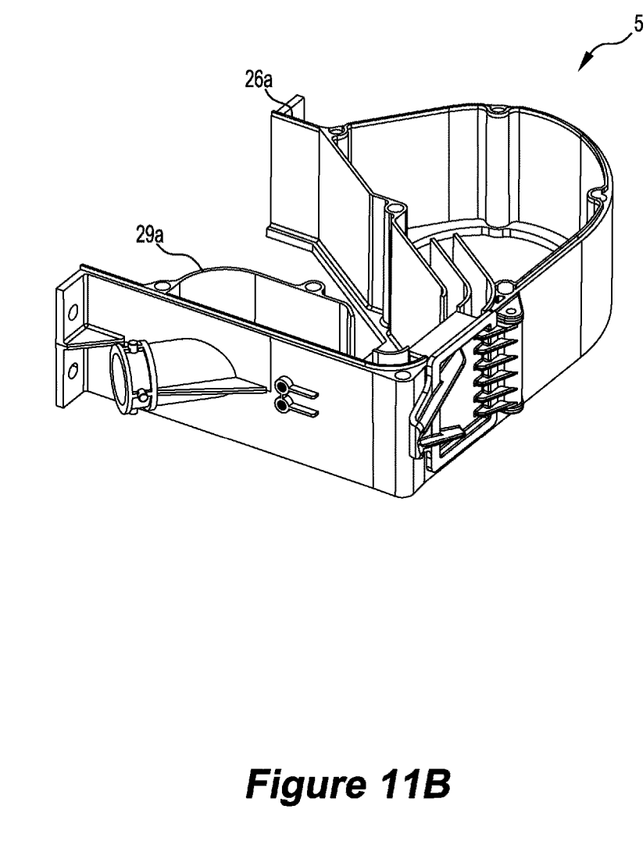
FIG. 11B is a perspective view of an open formwork side of the entrainment unit, illustrating the plurality of walls to be received in the recesses of an adjacent wall form when stacked together side-by-side (as shown in FIG. 11A).

In some embodiments, the abutting edge 56 protrudes from the wall form 5, to be received in a complementary recess 57 on the closed side wall 19 of the wall form 5 (see FIG. 11B). In some embodiments the closed side wall 19 provides a plurality of recesses 57, 57a, 57b thereacross, each positioned and dimensioned to receive a complementary edge of the front face of the wall form surrounded by the abutting edge 56 (see FIG. 11A). For example, the recess 57a is shaped and dimensioned to receive an edge 29a of the curved portion 29 of the wall 27 of the seed chamber 10. Additionally, recess 57b is shaped and dimensioned to receive an edge 26a of the first inclined wall 26 of the mixing chamber 20 which travels diagonally across the internal cavity 11 of the wall form 5. These edges and complementary recesses provide for a snug fit between adjacent wall forms 5 (and entrainment units 1, when assembled in side-by-side relationship. The edges and recess assist in aligning adjacent entrainment units 1 and reduce the need for seals or gaskets between adjacent units. The edge and recess receiving the edge act like a labyrinth-type seal to prevent air from the air chamber of a first unit 1 escaping into an adjacent unit 1'.

At least one of the end plates 15 provides an air inlet manifold 84 for connection with a hose 85 providing an air source to the unit 1. The air source can be a pressurised air source depending on the required flow of the unit 1. It is contemplated that a working pressure range for the air supply 31 could vary from 0 psi-2000 psi. The wall form 5 can comprise an air intake aperture 21 for receiving an air supply into the unit 1. While it is contemplated that a single air source will run the entrainment unit 1, an air supply can be introduced through each of the end plates 15 to either increase the air flow though the unit 1, or more evenly disperse the air flow through the unit 1.

The end plate 15 further provides a mounting flange 22 for securing the end plate 15 to a hopper 80. This leaves the entrainment unit 1 with no external moving parts during use. This may increase the working life of the unit 1 and further may reduce the opportunity for injury to persons working the unit 1 and attached planter.

Figure 6:
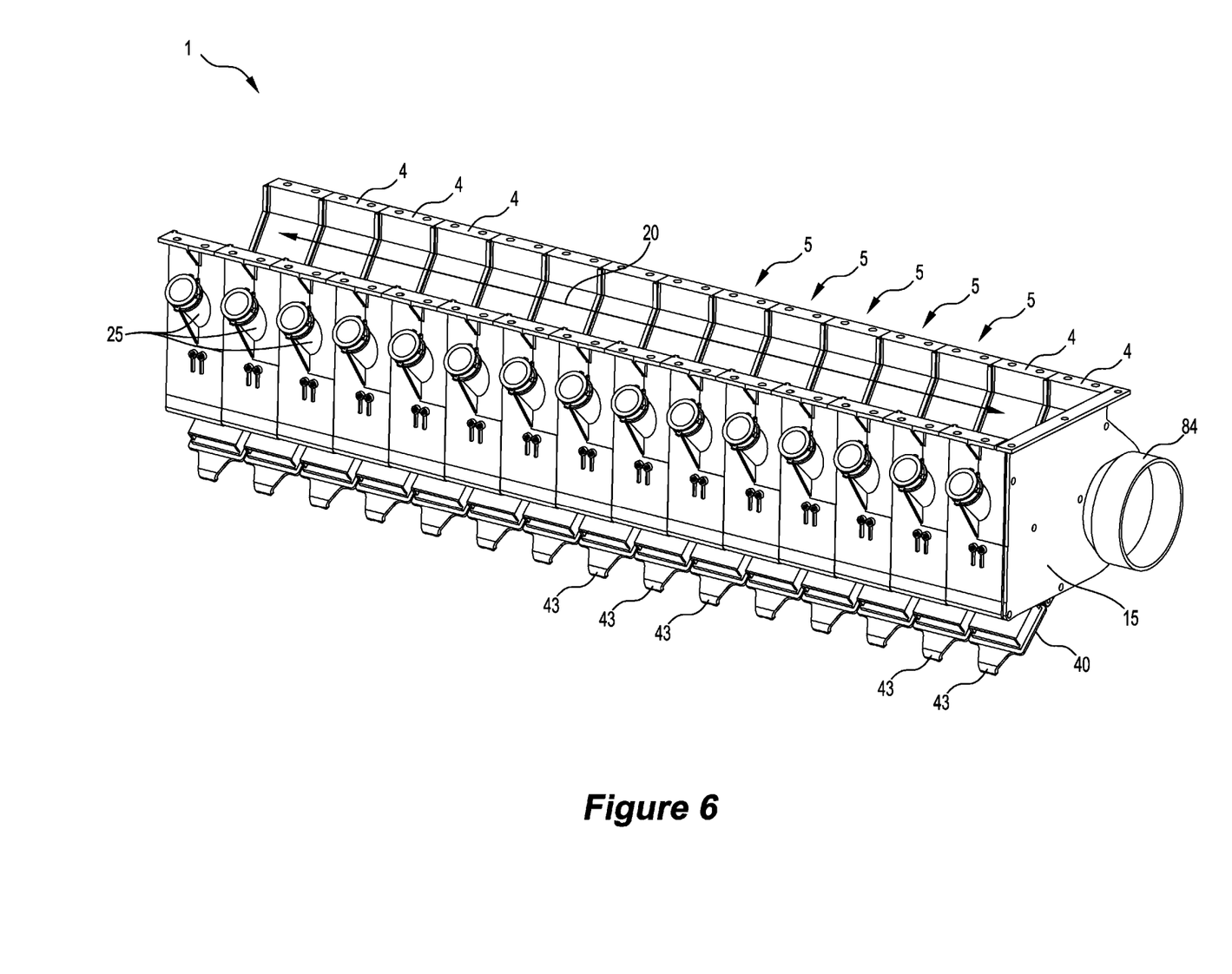
FIG. 6 is a perspective view of a plurality of wall forms positioned side-by-side and sealed with a closing plate, to form a collective seed chamber within the plurality of discharge outlets.
Figure 7:
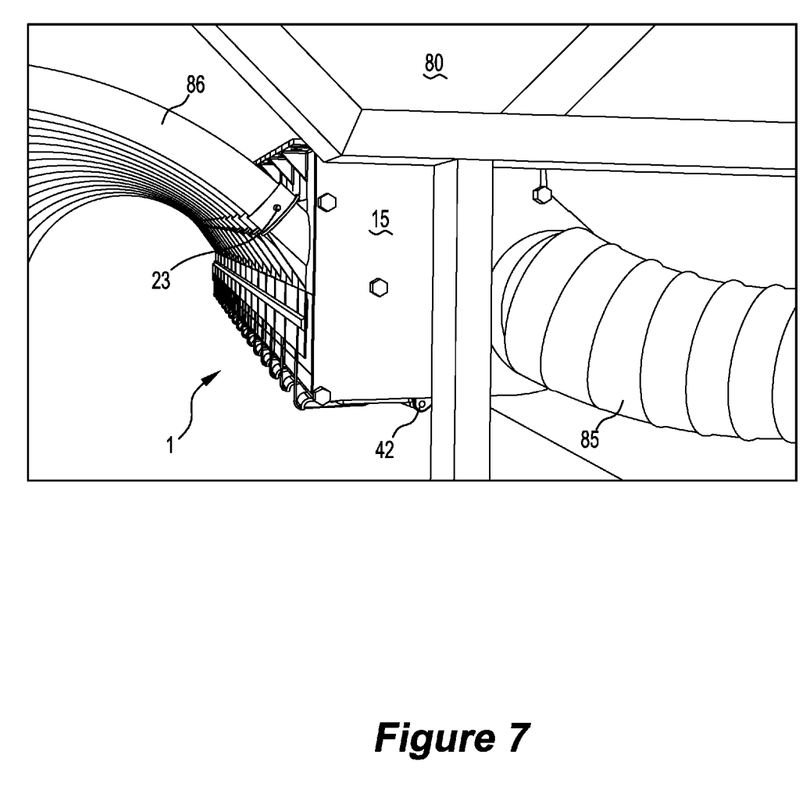
FIG. 7 is a perspective view of an entrainment unit comprising a plurality of wall forms mounted under a seed hopper.
Figure 8:
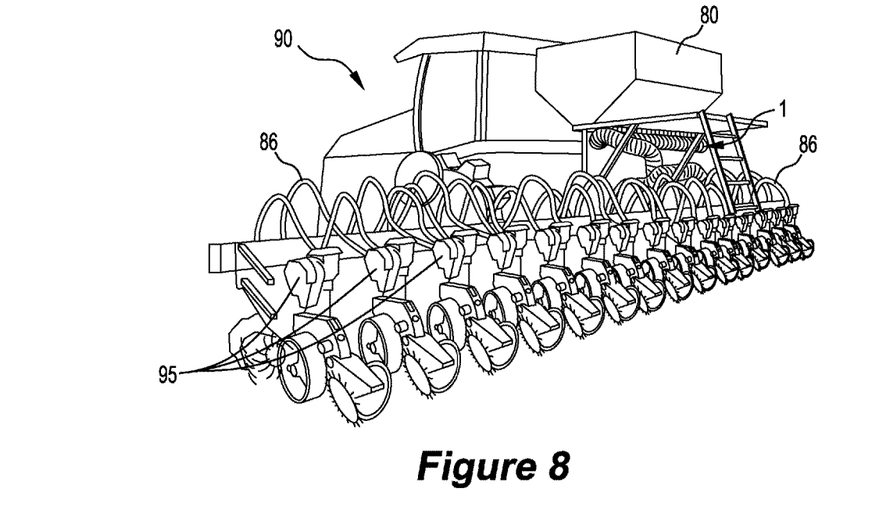
FIG. 8 is a perspective view of a planter, having an entrainment unit comprising a plurality of wall forms mounted under a seed hopper.
Figure 9:
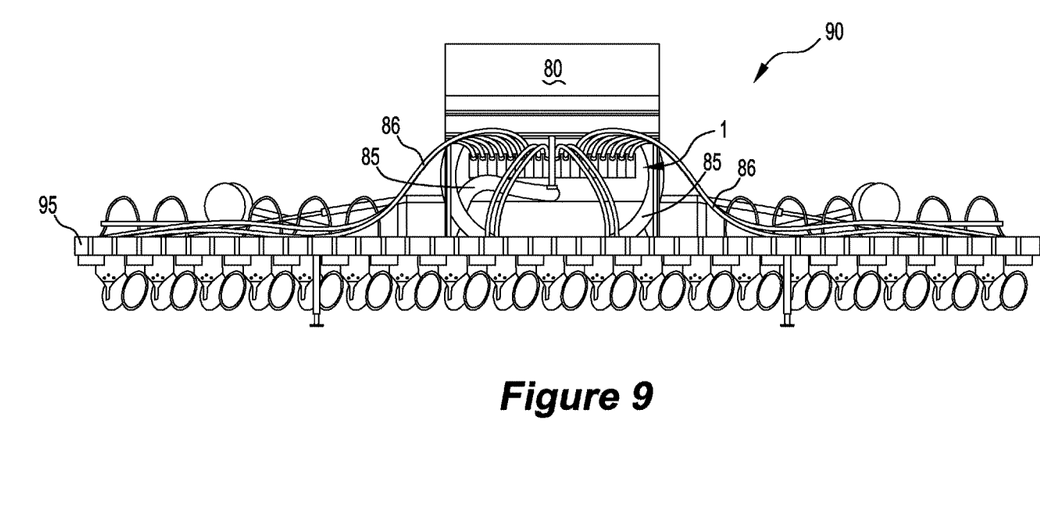
FIG. 9 is a front view of a seed distribution system, illustrating a plurality of conduits, each conduit extending from a discharge outlet of the entrainment unit to a separate seed metering unit.
Figure 10A:
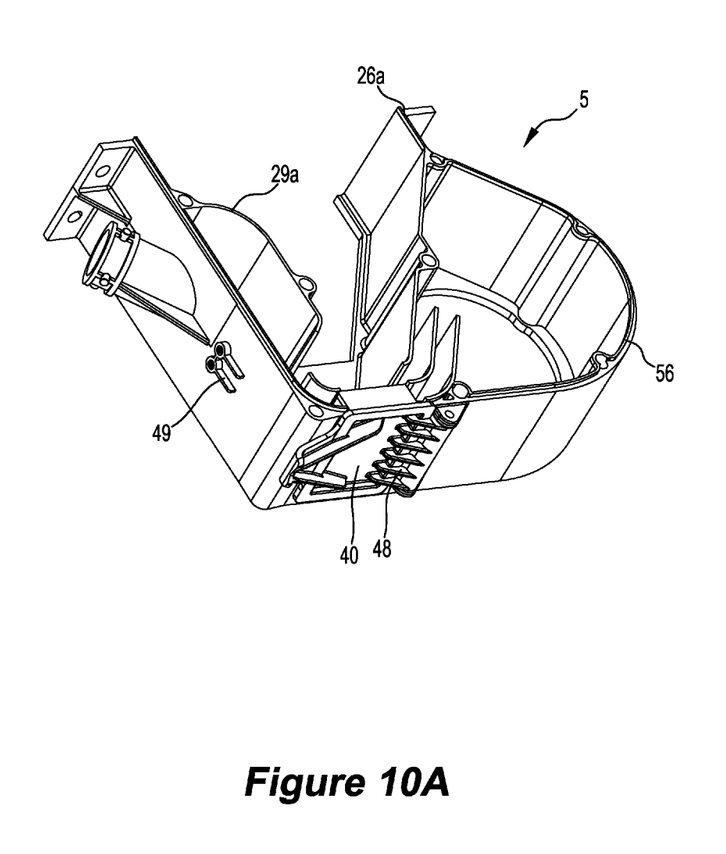
FIG. 10A is a perspective view of the entrainment unit, illustrating a plurality of stiffening webs on an exterior side of the door.
Figure 10B:
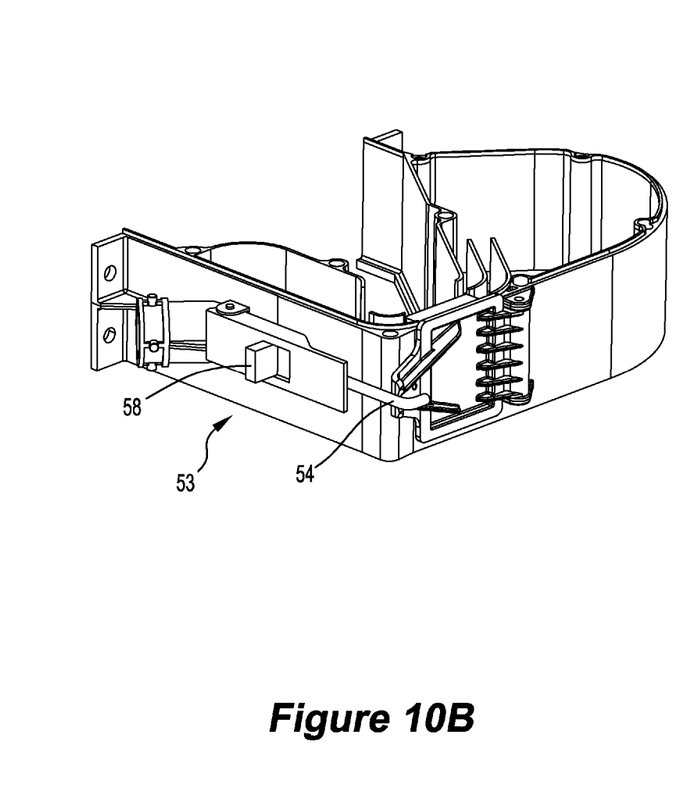
FIG. 10B is a perspective view of the entrainment unit, illustrating a latch for holding the door closed.

In some embodiments of the entrainment unit 1, a plurality of wall forms 5 are abutted to one another side-by-side, to form a multi-outlet 25 entrainment unit 1 (see FIG. 6). In this configuration a single pair of end plates 15 is used to seal each of the outermost wall forms 5, to create a single seed chamber 10 with multiple outlets 25. The pair of end plates 15 can provide an air inlet manifold 84 at each end of the array of wall forms 5.

Figure 2:
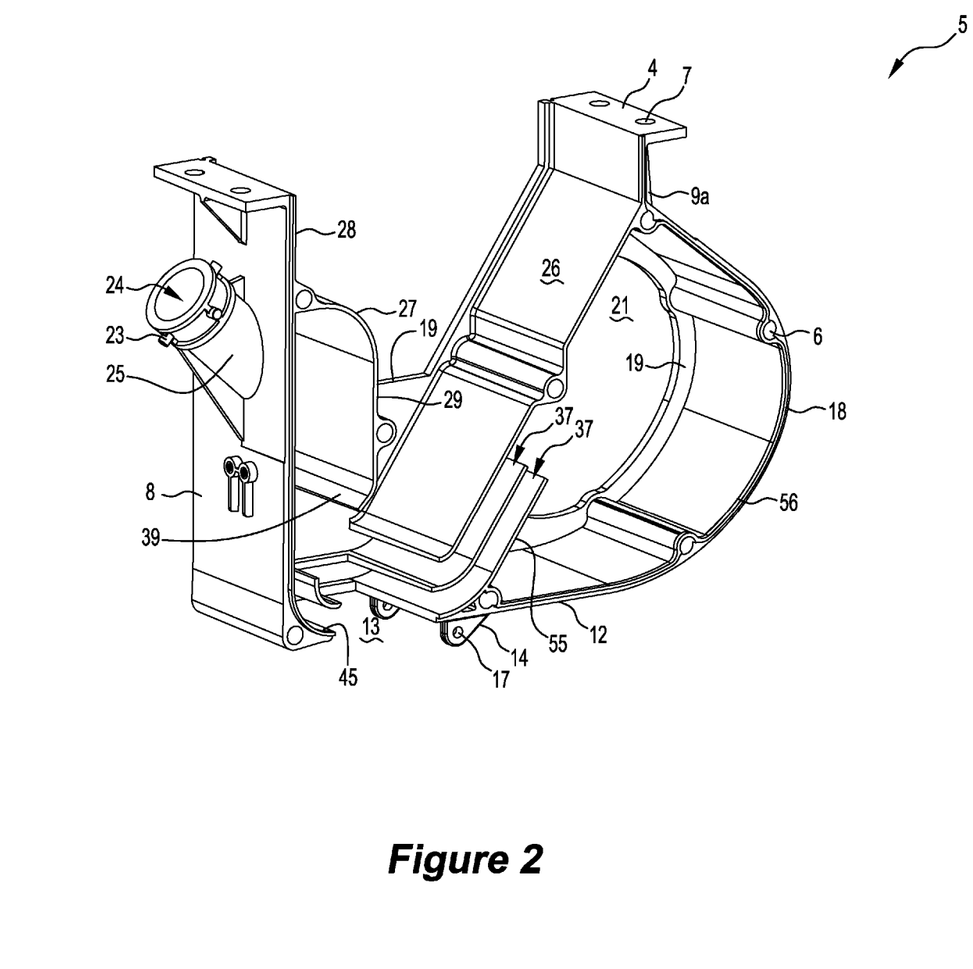
FIG. 2 is a perspective view of the wall form of the entrainment unit of FIG. 1, formed in a single moulded unit.
Figure 3:
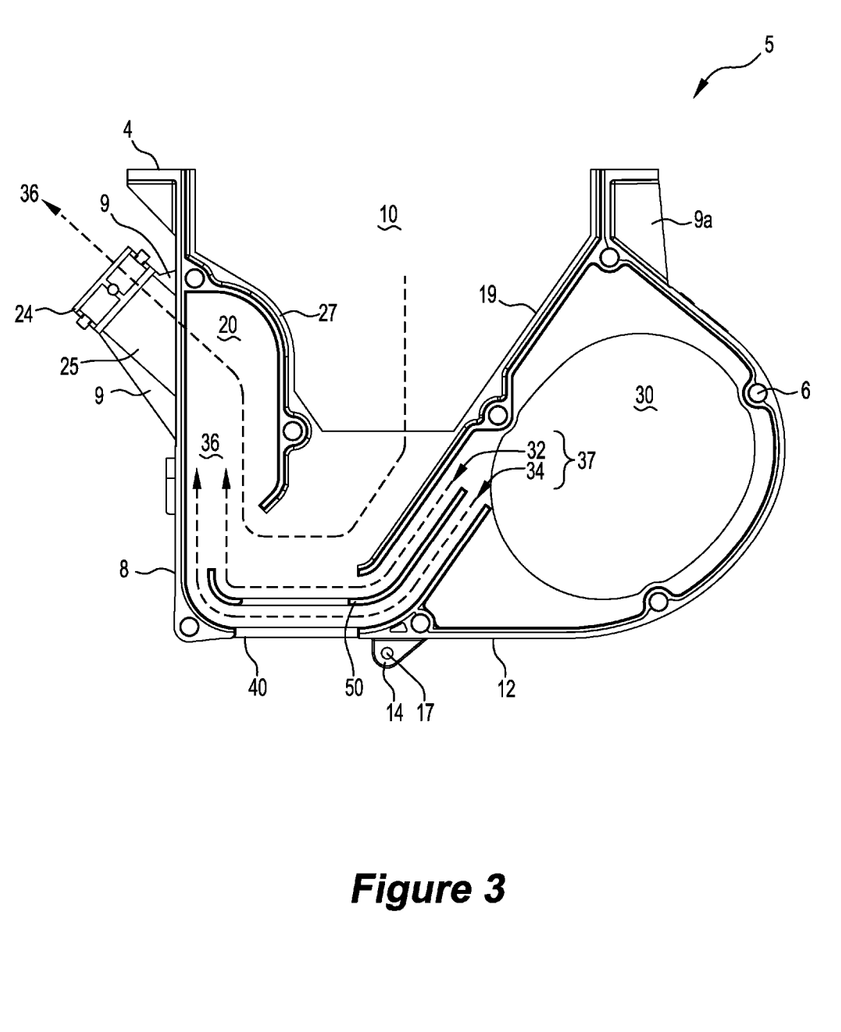
FIG. 3 is a schematic view of an entrainment unit illustrating the flow of seed and air through the unit.

Turning to FIG. 2, the wall form 5 is illustrated in isolation. The wall form 5 can be formed from a plurality of individual components, or as illustrated in FIG. 2, can be formed in a one-piece moulding or casting.

Wall Form Exterior

The wall form 5 will be described herein in reference to a working orientation, illustrated in FIG. 2, where seed is introduced into the unit 1 from an open top surface 3. The seed falls from a hopper 80 (not illustrated in FIG. 2) into the seed chamber 10 wherein the seed moves through the unit 1 under gravitational force in combination with air flow through the unit 1.

The open top surface 3 of the unit 1 further provides a pair of mounting flanges 4 disposed on opposing sides of the top 3. The mounting flanges 4 are configured to be directly mounted to the seed hopper 80 for receiving seed in bulk. In FIG. 2 the flanges 4 are provided with holes 7 for receiving a bolt, screw, nail, pin, clip or the like for releasably securing the entrainment unit 1 to the hopper 80.

Typically, the hopper 80 can receive as much as 60 kg of seed in one load, which is then slowly distributed to the entrainment unit 1. The feeding of the entrainment unit 1 can be monitored and even controlled by use of a Venturi valve that monitors the height of seed within the seed chamber 10 at any given time. When seed in the seed chamber 10 is at a sufficient height to block the venture valve, the seed flow from the hopper 80 is stopped. As the seed chamber 10 empties and the height of seed in the seed chamber 10 drops below a location of the Venturi valve, the flow of seed from the hopper 80 is restarted.

The wall form 5 is configured so that it can be injection moulded from a suitable plastics material, for example ABS;

PPE; PE or PET or related glass reinforced plastic material. UV stabilisers and other additives can be introduced into the material of the wall form 5 to improve mechanical characteristics of the wall form 5, such as strength, durability, UV resistance and working life, as may be required. The invention is not limited to this method of manufacturing the wall form 5 or the materials selection.

Discharge Outlet

A front face 8 of the wall form 5 provides a discharge outlet of the unit 1 in the form of a snorkel 25. The snorkel 25 projects outwardly from the front face 8 of the wall form 5. The snorkel 25 projects upwardly towards the open top surface 3 of the unit 1.

The snorkel 25 extends upwardly away from the vertical front face 8 of the wall form 5, at an inclination angle α. The angle α is greater than 90 degrees, from the vertical, to provide a steady egress to the entrained seed and air mixture. If the angle α is less than 90 degrees the entrained seed and air mixture must turn through the 90 degree angle while being discharged from the snorkel 25, the change in velocity can negatively affect the flow of the entrained seed: by losing speed; causing the seed to impact the sides of the snorkel 25 and mixing chamber wall; and potentially damming the snorkel 25.

In FIG. 5, the angle α is about 135 degrees from the vertical front face 8 of the wall form 5. This snorkel angle works in concert with a curved wall 29 that is shared between the seed chamber 10 and the mixing chamber 20, to guide the flow of entrained seed and air from the mixing chamber 20 to the snorkel 25 smoothly.

The snorkel 25 is supported by a pair of webs 9 integrally formed with the wall form 5. The webs 9 strengthen the snorkel 25 and provide stability thereto. In use, the snorkel 25 will be attached to a discharge hose 86 (illustrated in FIGS. 8 and 9).

A distal end 24 of the snorkel 25 is configured to receive and engage with the discharge hose 86. The distal end 24 of the snorkel 25 provides a plurality of projections 23 for hose 86 engagement. The projections 23 can be integrally formed in the wall form 5. Alternatively, the projections 23 can be formed as part of a mounting collar (not illustrated) to be attached to the wall form 5 in a separate manufacturing operation.

A base 12 of the wall form 5 also provides an opening, wherein the base of the unit is disposed on an opposing side of the unit 1 to the top surface 3. The base 12 provides an opening 13 through which seed and other trapped seed can be released from within the entrainment unit 1. The opening 13 is formed in a base 12 of the unit 1 such that gravitational force will cause trapped seed in the unit 1 to fall out of the opening 13. The opening 13 is sealed during operation of the unit 1 by the door 40.

The base 12 of the wall form 5 provides at least one bracket 14 (three illustrated in FIG. 2) to which the door 40 is pivotally mounted. The protrusions 14 each provide a central aperture 17 for receiving a pin (not illustrated) wherein the pin mounts the door 40 to the protrusions 14 allowing the door 40 to pivotally rotate about an axis that extends through each of the central apertures 17.

A rear face 18 of the wall form 5 is partially arcuate, externally curving around the air chamber 30 within.

A side wall 19 of the wall form 5, adjacent the rear face 18, provides the air intake aperture 21. The air intake aperture 21 is rounded and provides an unobstructed air intake to the air chamber 30

The side wall 19 does not extend the width and breadth of the wall form 5. As such, the unit 1 relies on the pair of end plates 15 to seal the sides of the wall form 5. The side wall 19 fully seals one side of the mixing chamber 20. This prevents seed in the mixing chamber 20 from intermingling with seed in an adjacent mixing chamber 20' of an adjacent wall form 5' when a plurality of wall forms 5 are combined to form the unit The side wall 19 partially seals the seed chamber 10. Where the unit 1 is formed from a plurality of wall forms 5 the seed chambers 10 of each wall form 5 combine to receive seed from the hopper 80. A function of the side wall 19 is to hold the wall form 5 in one-piece such that the wall form 5 can be handled prior to be combined with at least one end plate 15.

Strengthening the rear face 18 of the wall form 5, and extending between the arcuate rear face 18 and the mounting flange 4 is an additional web 9*a*.

An internal cavity 11 of the unit 1 is partitioned to form the three chambers: the seed chamber 10, the air chamber 30; and the mixing chamber 20, each of which will now be described in further detail in reference to the embodiments illustrated in FIGS. 1 to 4.

Seed Chamber

The seed chamber 10 is configured in a V-shape, extending from the open top surface 3 of the wall form 5, and narrowing towards the base 12 of the wall form 5. The seed chamber 10 provides a chute for the seed to travel through, from the hopper 80 to the mixing chamber 20.

A first inclined wall 26 of the mixing chamber 20 travels diagonally across the internal cavity 11 of the wall form 5, from the mounting flange 4 towards the base 12 of the wall form 5. The inclined wall 26 separates the seed chamber 10 from the air chamber 30.

An opposing wall 27 of the seed chamber 10 provides a straight portion 28 and a curved portion 29. The curved portion 29 of the wall 27 of the seed chamber 10 separates the seed chamber 10 from the mixing chamber 20.

At the lowest point of the seed chamber 10 there is a baffle 50. The baffle 50 separates the first air flow 32 from the second airflow 34 upon their exit from the air chamber 30. Adjacent the baffle 50 the seed within the seed chamber 10 is brought into contact with the first air flow 32 to entrain the seed therein and transport the seed towards the mixing chamber 20.

As the seed in seed chamber 10 comes into contact with the first air flow 32, the seed is transported towards the mixing chamber 20. This action then allows further seed within the seed chamber 10 to fall towards the baffle 50 under gravitational force to continue to pull the seed through the entrainment unit 1.

Air Supply Unit

The air supply unit 31 comprises an air supply (not illustrated), pumped into the air chamber 30 via an air hose 85 and at least a first air passage 33 and a second air passage 35 within the cavity 11, separating the incoming air into the first air flow 32 and the second air flow 34.

Where a plurality of wall forms 5 are arranged to form the unit 1, a single air source can be used, driving air into the unit 1 from the air hose 85 into at least one of the end plates 15. If additional air flow is required, an air intake manifold 84 can be provided in each of the two end plates 15 to introduce air into the entrainment unit 1 from both ends thereof.

FIGS. 3 and 5 are schematic side views of the wall form 5, clearly identifying the first passage 33 and second passage 35 exiting the air chamber 30, through which the first flow 32 and second flow 34 of air are respectively discharged from the air chamber 30 to interact with the incoming seed from the seed chamber 10.

An internal wall 55 extends into the air chamber 30. The wall 55 extends from the base 12 of the wall form 5 and travels parallel to the inclined wall 27 of the seed chamber 20 creating an air outlet 37 from the air chamber 30. The air outlet 37 is divided into the two passages 33, 35 by the internal baffle 50.

The two passages 33, 35 run parallel to one another and are inclined to the base 12 of the wall form 5, extending inwardly and upwardly into the air chamber 30. This upwards inclined angle of the two passages 33, 35 assists in preventing, or at least reducing, seed from being blow out of the seed chamber 10 and into the air chamber 30. Although this is unlikely when the unit 1 is in use and there is a positive air flow through the unit 1, there are disruptions to the air supply to the unit 1 each time the unit 1 is started-up and stopped. It is preferable that seed is not drawn back into the air chamber 30 from the seed chamber 20 at these times.

The baffle 50 extends along the air outlet 37 parallel to the adjacent walls 27, 55. In the embodiment of FIGS. 1-4 the two passages 33, 35 are of a similar volume. However, it is contemplated that the passages 33, 35 can be of dissimilar volumes in some embodiments of the invention, to thereby vary the volume of air flow in the first air flow 32 compared to the volume of air flow in the second air flow 34.

Air exits the air chamber 30 via an air chamber outlet 37. As the air leaves the air chamber 30 via the outlet 37, the baffle 50 continuously separates the first air flow 32 from the second air flow 34.

The baffle 50 extends across a lower portion of the seed chamber 20 parallel to the base 12 of the wall form 5 before continuing towards an entrance 38 to the mixing chamber 20. This form to the baffle 50 guides the first air flow 32 horizontally across the base of the seed chamber 10, constantly passing the first air flow across the head of the impinging seed, thereby urging the seed towards the mixing chamber 20. The baffle 50 continues to extend into the mixing chamber 20.

The smooth curves of the baffle 50 facilitate a smooth, planar air flow along each of the first and second air flows 32, 34. This provides an efficient flow of air through the unit 1.

As the baffle 50 enters the mixing chamber 20, an end lip 52 of the baffle 50 curves upwardly into the mixing chamber 20 to direct air flow into the mixing chamber 20.

Where the first air flow 32 contacts the lip 52 of the baffle 50, the air flow 32 is converted from a laminar flow to a turbulent flow upon entering the mixing chamber 20. This is partly due to the air flow 32 being forced into he upturned lip 52, against the horizontal air flow, which causes a sharp or sudden change in direction to the first passage and this the air flow 32 within. The change in direction caused by the lip 52 is also coupled with a termination of the baffle 50. The air flow traveling along the baffle 50 sticks to the surface of the baffle 50 and becomes disrupted when the baffle 50 terminates. This disruption of the first flow 32 is further excited by the introduction of the second air flow 34 (which is free from seed) and enters the mixing chamber directly as the baffle 50 terminates. The turbulence created in the first air flow 32 swirls the entrained seed within the air flow 32 and thereby reduces the seed from becoming clogged at an entrance 38 to the mixing chamber 20. Seed entering the mixing chamber 20 entrained within the first air flow 32 is prevented from exiting the mixing chamber 20 by both the incoming seed and air mixture within the first air flow 32 and the second air flow 34 entering the mixing chamber 20 from below the baffle 50.

The second air flow 34 exits the air chamber 30 via the air chamber outlet 38 and is channeled along the second flow passage 35, the second passage 35 being separated from the seed chamber 10. The second air flow 34 does not contact entrained seed within the first air flow 32 until the second air flow 34 enters the mixing chamber 20.

The second air flow 34 is directed along the second flow passage 35 which extends along the baffle 50 on an opposing side to that of the seed chamber 10.

The smooth curves of the baffle 50 facilitate a smooth, planar air flow along each of the air flows 32, 34. The second air flow 34 is guided, smoothly along the underside of the baffle 50, into the mixing chamber 20 along the upturned lip 52 of the baffle 50.

As the second air flow 34 enters the mixing chamber 20 the second air flow 34 is instantly brought into contact with the turbulent first air flow 32 and entrained seed therein. The first and second air flows 32, 34 then become combined to form a combined air flow 36 with the seed entrained therein. The combined air flow 36 and entrained seed are then directed through the mixing chamber 20 towards the snorkel 25.

The combination of dual air flows provided within the unit 1 can be applied across a range of sizes of seeds (such as fava beans or canola), without the need to constantly adjust internal baffles of the unit 1 or adjust the air supply to the unit 1. The thorough mixing of the seed and air that is induced by the dual air flows may also prevent blockages within the passageways of the unit 1, thereby reducing down-time of the planter.

Mixing Chamber

The mixing chamber 20 is formed by the front wall 8 of the wall form 5, a portion of the base 12 of the wall form 5, the two incoming air passages 33, 35 on opposing sides of the baffle 50, and the curved lower wall 29 (shared with the seed chamber 10).

At a lowermost portion of the curved wall 29 there is formed a lip 39 that extends inwardly into the mixing chamber 20. The lip 39 guides seed from the seed chamber 20 towards the entrance to the mixing chamber 38.

The lip 39 extends into the mixing chamber 20 at an angle similar to that of the inclined first wall 27 of the seed chamber 10. The lip 39 extends into the mixing chamber 20 by only a few centimetres, such that an imaginary extension of the lip 39 (illustrated as dotted line 37*a* in FIG. 5) passes just in front of the upturned lip 52 of baffle 50.

The lip 39 channels the combined air flow 36 within the mixing chamber 20 to reduce the combined air flow 36 being directed back towards the seed chamber 20 and potentially disrupting the steady flow of the seed entrained within the first air flow 32, upon entry into the mixing chamber 20.

An uppermost portion of the curved wall 29, provides a gradual, planar curved surface to guide the seed entrained within the combined air flow 35 towards the snorkel 25 to minimise the opportunity for seed to dam the snorkel 25 on exiting the unit 1.

Referring now to FIGS. 1 and 3-5, the baffle 50 is illustrated to be partially formed with the door 40. Best illustrated in the perspective view of FIG. 1, the door 40 comprises a pair of cylindrical members 41 for encasing a pin between the brackets 14 to form a door hinge 42. Alternative means for forming a hinge 42 to pivotally connect the door 4 to the wall form 5 are also contemplated. For example, either of the brackets 14 or the cylindrical members 41 can be formed with an interconnected pin for directly mounting to each other. Alternatively, the cylindrical members 41 can be made from a resilient material to snap-fit into the brackets 14 of the wall form 5. In alternative embodiments, the door 40 can comprise a resilient material or a resilient seal to be compressed into the opening 13 and held in place by compression of the resilient material alone.

The door 40 further comprises a gripping portion, illustrated in FIG. 1 as a handle 43. The handle 43 facilitates access to open and close the door 40 while the unit 1 is attached under a hopper 80. The handle 43 can comprise a resilient material to snap-fit into engagement with a rim 45 of the wall form 5. In an alternative embodiment the handle 43 can be fitted with a key or other twist activated locking member. However, any protrusion or obstruction into the flow passages 33, 35 may restrict the air flows 32, 34 therein.

As the door 40 opens in the base 12 of the wall form 5, any seed at the bottom of the seed chamber 10, in the first passage 33 and the second passage 35 can be evacuated from the unit 1. This is facilitated by an upper door portion 44 which provides a removable segment to the baffle 50.

Figure 4:
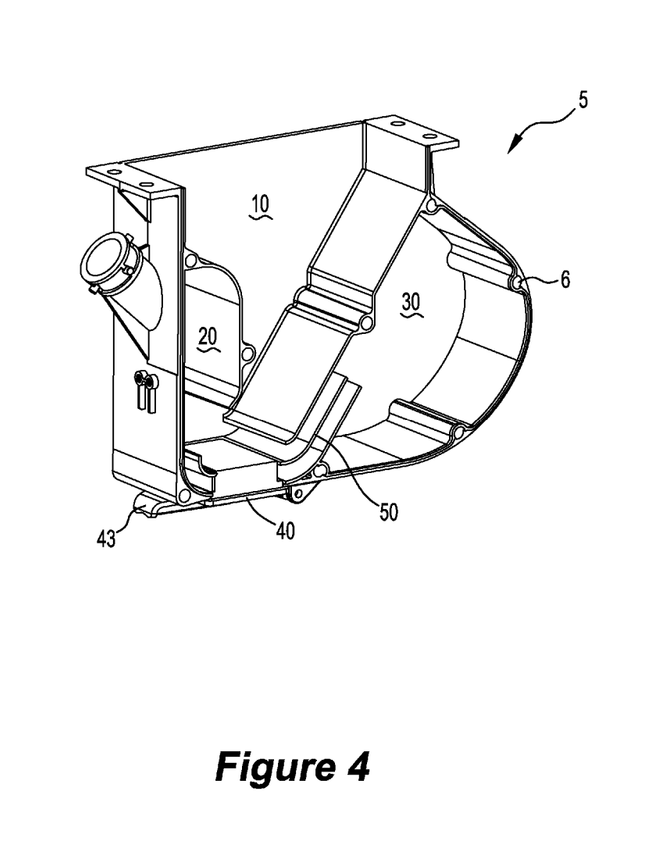
FIG. 4 is a perspective view of the wall form of FIG. 2, illustrating the door in a closed configuration in a lower portion thereof.

The upper door portion 44 comprises a hollow rectangular prism. A top surface 47 of the upper door portion 44 is planar and, when the door 40 is closed, the top surface 47 seamlessly aligns with the baffle 50, as it extends across the lower portion of the seed chamber 10. The centre of the upper door portion 44 provides a rectangular conduit 46 having substantially the same cross-sectional area as the second flow passage 35. As such, when the door 40 is closed, the first and second flow passages 33, 35 are separated from one another and unobstructed, as illustrated in FIG. 4.

Figure 5:
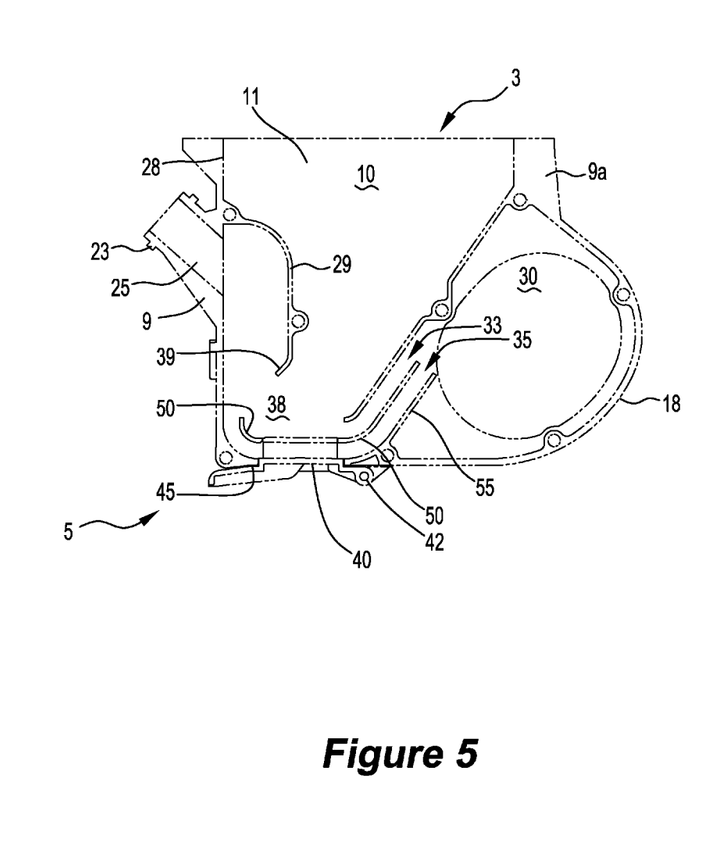
FIG. 5 is a sectional view through the centreline of a discharge outlet of the wall form of FIG. 4.

The upper door portion 44 swings free from inside the unit 1 and pivots away from the base 12 when the door 40 is rotated about hinge 42. Simultaneously, the conduit 46 and top surface 47 are disconnected from the baffle 50 thereby providing access to the second flow passage 35, and access to the first flow passage 33, through the baffle 50. This facilitates access to the interior cavity 11 of the unit 1, as illustrated in FIG. 5.

The door 40 is also contemplated to be easily removable, and easily replaceable without the need to uncouple the unit 1 from the hopper 85.

The dual airflows 32, 34 as described herein assist in providing a steady and even flow of seed through the entrainment unit 1. The dual flow can be used to effectively entrain and thereby distribute different grain sizes, reducing the need to adjust air pressure and fan speed into the unit 1 when switching from one seed to another.

In some embodiments, like that illustrated in FIGS. 10A-10B and 11A-11B, the door 40 can be provided with a plurality of stiffening webs 48. These webs48 provide stiffness and thus support for the door 40, without undue weight penalty.

Also illustrated in FIG. 10A, on a front face 8 of the wall form 5 is a mounting boss 49 having a pair of apertures for receiving a latch 53. The boss 49 is integrally formed with the wall form 5.

The latch 53 is rigidly mounted to the wall form 5 via a pair of screws (or bolts, rivets, or studs). Hinged to, and extending from, a first end of the latch 53 is an engagor illustrated in FIG. 10B as a hook 54. The hook 54 extends along the wall form 5 and captures a portion of the door 40, to hold the door in a closed position. The latch 53 also comprises a release 58, that is spring-loaded. When the release is actuated, the hook 54 is freed to extend away from the door 40, releasing the door 40 and allowing the door 40 to swing open away from the base 12 of the wall form 5, emptying any trapped seed from the door 40 and neighbouring internal areas of the entrainment unit 1. To re-seal the entrainment unit 1, the door 40 is rotated back into the closed position, where the hook 54 is located onto the perimeter of the door 40. The latch 53 is then clicked into place against the spring of the release 58, to retain the latch 53 and the door 40 in the closed position.

Multi-Discharge Outlet Unit

The wall form 5 is modular by design, and can be abutted in side-by-side relationship with a plurality of wall forms 5 to provide a multi-discharge outlet 25 unit 1, illustrated in FIG. 6.

The modular unit 1 can be configured to match the output needs of an existing planter and retrofitted thereto.

Each of the wall forms 5 is configured as described above, and provides an outlet snorkel 35 and a door 40 for internal access to the cavity 11 therein. Without a second end plate 15 interleaved between each of the wall forms 5, the seed chamber 10 of each of the wall forms 5 becomes combined into a single, increased capacity seed chamber 10. Furthermore, each of the air intake apertures 21 of each wall form also becomes combined within the single air supply 31 to drive the unit 1. However, each individual mixing chamber 20 of each individual wall form 5 remain separate. Keeping the mixing chambers 20 separated facilitates the desirable conditions for entraining seed within the combined air flow 36 of each mixing chamber 20 and minimising the opportunity for damming of any one of the snorkels 25.

Illustrated in FIG. 7 is an entrainment unit 1 according to one embodiment of the invention, having 20 wall forms 5 abutted side-by-side between the pair of end plates 15. Each individual wall form 5 is bolted to an open base of the hopper 80. An air source is introduced into the unit 1 from the air hose 85. A similar air hose 85 is mounted at the opposing end of the unit via a second of the pair of end plates 15 (illustrated in FIG. 9).

A discrete seed discharge hose 86 is coupled to each of the snorkels 25 for disbursing the entrained seed and air directly to a seed metering unit 95 (illustrated in FIGS. 8 and 9). It is preferable that the discharge hoses 86 are not kinked or turned through any tight angles to disrupt the flow or air and entrained see therein.

It is contemplated that a wall form 5 could be adapted in accordance with the invention as described herein, such that the snorkel 25 is configured to discharge entrained seed and air in a predetermined direction to suit specific planter 90 and hose 86 arrangements.

Although not visible in FIGS. 6-8 it is contemplated that a resilient seal be located and compressed between each pair of wall forms 5, and also between the wall form 5 and the adjacent end plate 15. The seal would provide for a better seal within the internal cavity 11 and reduce air gaps that could reduce efficiency of the unit 1. Seals are also contemplated for use between the air inlet manifold 84 and its attached air hoses 85 and between the top end of the snorkel 24 and its attached seed discharge hose 86.

In one embodiment, there is provided a method of distributing seed, comprising the steps of: supplying seed in bulk to a seed chamber 10; entraining seed in a first air 32 flow in the seed chamber 10; transporting the seed from the seed chamber 10 into a mixing chamber 20; supplying a second air flow 34 directly to the mixing chamber 20 so that the first and second air flows 32,34 mix seed entrained in the first air flow 32 in the mixing chamber 20 and transport the seed through a discharge outlet 25 of the mixing chamber 20.

It is contemplated that the air flow 32 and second air flow 34 can be provided from two different air sources. Using the form work 5 described herein, the air source is delivered into the air chamber 30 of the entrainment unit 1 and upon exiting the air chamber 30 via the chamber outlet 37, the air is directed into the two separate air flows 32 and 34.

The air chamber outlet 37 is divided into two passages 33, 35 to separate the air flow into first 32 and second 34 flows. The outlet 37 is divided by a baffle 50 that extends from the air chamber 30 into the mixing chamber 20. The two air flows 32, 34 are drawn along opposing sides of the baffle with a laminar flow. The baffle 50 provides a common wall between the two passage ways 33, 35 that keeps the two air flows 32, 34 separate.

The first air flow 32 is directed towards the seed chamber 20 of the unit 1, to entrain seed therein and to transport the seed to the mixing chamber 20. The first air flow 32 travels across a top surface 47 of the baffle 50 which passes through a lower portion of the seed chamber 10.

The seed becomes entrained within the first air flow 32 and is then transported to the mixing chamber along the top surface 47 of the baffle 50. As the seed entrained within the first air flow 32 is forces into contact with the lip 52 of the baffle 50, the laminar air flow 32 is disrupted and the vortices are created within the air flow 32 causing the air flow 32 to become turbulent. The turbulent air flow 32 reduced the opportunity for the seed therein to become blocked or stuck in the entrance 38 of the mixing chamber 20. The turbulent air flow 32 also forces the seed upwardly in the mixing chamber 20 towards the discharge outlet 25. The lip 39 of the lower portion of mixing chamber wall 29 reduces the opportunity for entrained seed captured in the now turbulent first air flow 32 from being pushed back towards the seed chamber 10.

The second air flow 34 is not brought into contact with seed until it reaches the mixing chamber 20. The second air flow 32 is drawn along an underside of the baffle 50, which forms the second passage 35 in combination with the base 12 of the wall form 5. The second air flow 34 travels along the second passage 35 in a laminar flow. Ideally the first 33 and second 35 passages are free form any intrusions or projections that could restrict the air flows 32, 34 or reduce the efficiency of the entrainment unit 1.

As the second air flow 34 reaches the mixing chamber the laminar air flow 34 is directed upwards along the front face 8 of the wall form 5, partly guided by the front face 8 and partly guided by the lip 52 at the end of the baffle 50. As the second air flow 34 travels upwards in the mixing chamber 20, it meets the first air flow 32 and entrained seed, combining to form a combined air flow 36 entraining the seed therein.

As the second air flow 34 travels towards the entrance to the mixing chamber 38, the second air flow 34 pulls the seed entrained in the first air flow 32 into the mixing chamber 20 as the two air flows combine. The pushing of the seed towards the mixing chamber 20 from the first air flow 32 is enhanced by the pulling of the seed into the mixing chamber 20 of the second air flow 34, further reducing the opportunity for the seed to block the mouth of the mixing chamber 38.

The method as described herein supplies the first air flow 32 and the second air flow 34 as parallel air flows into the mixing chamber 20 so that the second air flow 34 facilitates drawing the first air flow 32 with entrained seed into the mixing chamber 20 and minimises the possibility of blockages of the entrained seed from the seed chamber 10.

As the second air flow 34 joins the first air flow 32 and entrained seed, the velocity of the fluid flow through the mixing chamber 20 is increased, driving the seed entrained within the combined air flow 36 upwardly and out of the snorkel 25 in a steady and even stream. From the snorkel 25, the entrained seed is directed to a seed metering machine in preparation for sowing.

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

LEGEND

| No. | |
|---|---|
| 1 | Entrainment unit |
| 3 | Open top |
| 4 | Mounting flanges |
| 5 | Wall form |
| 6 | End plate mounting apertures |
| 7 | Unit mount holes |
| 8 | Front face of wall form |
| 9 | Support webs |
| 10 | Seed chamber |
| 11 | Wall form internal cavity |
| 12 | Base of the wall form |
| 13 | Opening in the base |
| 14 | Brackets |
| 15 | End plate |
| 16 | End plate mount holes |
| 17 | Door mount holes |
| 18 | Rear face of wall from |
| 19 | Side wall |
| 20 | Mixing chamber |
| 21 | Air intake aperture |
| 22 | End plate mount flange |
| 23 | Projections |
| 24 | Top end of snorkel |
| 25 | Discharge outlet (snorkel) |
| 26 | Inclined wall of mixing chamber |
| 27 | #2 wall of seed chamber |
| 28 | Upper wall |
| 29 | Lower wall |
| 30 | Air chamber |
| 31 | Air supply unit |
| 32 | First flow |
| 33 | First flow passage |
| 34 | Second flow |
| 35 | Second flow passage |
| 36 | Combined flow |

-continued

| No. | |
|---|---|
| 37 | Air chamber outlet |
| 38 | Mixing chamber entrance |
| 39 | Mixing chamber lip |
| 40 | Door |
| 41 | Cylindrical members |
| 42 | Door hinge |
| 43 | Handle. |
| 44 | Upper door portion |
| 45 | lip |
| 46 | conduit |
| 47 | Top surface |
| 48 | Stiffening web |
| 49 | Mounting boss |
| 50 | Baffle |
| 52 | End lip |
| 53 | Latch |
| 54 | Engagor |
| 55 | Internal wall |
| 56 | Abutting edge |
| 57 | Receiving recess |
| 58 | Release |
| 80 | Seed Hopper |
| 84 | Air inlet manifold |
| 85 | Air hoses |
| 86 | Seed discharge hoses |
| 90 | Planter |
| 95 | Seed metering units |

The invention claimed is:

1. An entrainment unit for distributing seed, comprising;
a seed chamber for seed in bulk;

a mixing chamber for mixing seed and air, the mixing chamber having a discharge outlet for discharging entrained seeds; and an air supply means having an air outlet divided into a first passageway and a second passageway for:

(a) supplying a turbulent first air flow into the mixing chamber via the first passageway so that the first air flow travels into and across to the seed chamber so that seed is entrained therein and transported to the mixing chamber, and (b) supplying a laminar second air flow into the mixing chamber via the second passageway, the second passageway extending around the seed chamber and directly into the mixing chamber to combine with the first air flow and form a combined air flow that distributes the seed and transports the seed through the discharge outlet;

wherein, in use, the combined air flow effectively entrains and distributes seeds of different sizes and weights from the entrainment unit without the need to adjust the air supply when switching from one seed to another.

2. The entrainment unit of claim 1, wherein the air supply unit comprises an air chamber for receiving air from an air source, the air source being one of a motor driven fan and a compressed air source.

3. The entrainment unit of claim 1, wherein the first passageway includes a first passage outlet for the first air flow to enter into the seed chamber and the second passageway includes a second passage outlet for the second airflow to enter into the mixing chamber.

4. The entrainment unit of claim 3, wherein the first passage outlet is in direct fluid communication with the seed chamber and the second passage outlet is in direct fluid communication with the mixing chamber.

5. The entrainment unit of claim 4, wherein the first and second passageways are parallel to each other.

6. The entrainment unit of claim 5, comprising a baffle that separates the first and second passageways.

7. The entrainment unit of claim 6, wherein the baffle provides a common wall that extends between the first and second passageways from the air chamber to the mixing chamber.

8. The entrainment unit of claim 7, wherein the common wall comprises three portions, namely an inclined portion situated at least partially in the air chamber;

a seed chamber portion that extends between the air chamber and the mixing chamber; and an upwardly curved portion that extends into the mixing chamber.

9. The entrainment unit of claim 8, wherein the inclined portion of the common wall provides a leading edge to separate air exiting the air chamber into the first and the second air flows.

10. The entrainment unit of claim 8, wherein the upwardly curved portion of the common wall is configured to induce turbulence into the first air flow such that the first air flow enters the mixing chamber as a turbulent air flow.

11. The entrainment unit of claim 8, wherein the seed chamber portion of the common wall defines a lower wall of the seed chamber.

12. The entrainment unit of claim 1, further including an internal wall that separates the mixing chamber and the seed chamber.

13. The entrainment unit of claim 12, wherein the internal wall includes a curved surface for guiding the combined air flow towards the discharge outlet.

14. The entrainment unit of claim 1, wherein the seed chamber includes at least one inclined side walls for funnelling seed under a gravitational force towards the mixing chamber.

15. An entrainment unit for distributing seed, comprising;

a seed chamber for seed in bulk;

a mixing chamber for mixing seed and air, the mixing chamber having a discharge outlet for discharging entrained seeds; and an air supply means for:

(a) supplying a turbulent first air flow to the seed chamber so that the first air flow travels into and across the seed chamber and seed is entrained therein and transported to the mixing chamber, and (b) supplying a laminar second air flow directly to the mixing chamber so that the second air flow can be combined with the first air flow to form a combined air flow that distributes the seed and transports the seed through the discharge outlet;

wherein, in use, the combined air flow effectively entrains and distributes seeds of different sizes and weights from the entrainment unit without the need to adjust the air supply when switching from one seed to another.

16. The entrainment unit of claim 1, wherein the air outlet of the air supply unit is one of a plurality of alike air outlets that together form a manifold.

17. The entrainment unit of claim 16, wherein the seed chamber is a common seed chamber, with each air outlet of the manifold being in fluid communication therewith.

18. The entrainment unit of claim 16, wherein the mixing chamber is one of a plurality of separate mixing chambers, with each air outlet of the manifold being in fluid communication with one of the mixing chambers.

19. The entrainment unit of claim 18, wherein the discharge outlet is one of a plurality of separate discharge outlets, with each mixing chamber of the manifold being in fluid communication with one of the discharge outlets.

20. The entrainment unit of claim 15, wherein the air outlet of the air supply unit is one of a plurality of alike air outlets that together form a manifold.

21. The entrainment unit of claim 20, wherein the seed chamber is a common seed chamber, with each air outlet of the manifold being in fluid communication therewith.

22. The entrainment unit of claim 20, wherein the mixing chamber is one of a plurality of separate mixing chambers, with each air outlet of the manifold being in fluid communication with one of the mixing chambers.

23. The entrainment unit of claim 22, wherein the discharge outlet is one of a plurality of separate discharge outlets, with each mixing chamber of the manifold being in fluid communication with one of the discharge outlets.

* * * * *